US011906976B2

(12) United States Patent
Oda et al.

(10) Patent No.: US 11,906,976 B2
(45) Date of Patent: Feb. 20, 2024

(54) MOBILE ROBOT (71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 14 days.

(21) Appl. No.: 17/690,639

(22) Filed: Mar. 9, 2022

(65) Prior Publication Data
US 2022/0334588 A1  Oct. 20, 2022

(30) Foreign Application Priority Data

Apr. 14, 2021 (JP) .................................. 2021-068317

(51) Int. Cl.
*G05D 1/02* (2020.01)
*G05D 1/00* (2006.01)
(52) U.S. Cl.
CPC .......... *G05D 1/0272* (2013.01); *G05D 1/0212* (2013.01); *G05D 1/0287* (2013.01); *G05D 2201/0216* (2013.01)
(58) Field of Classification Search
CPC ...... G05D 1/00; G05D 1/0272; G05D 1/0212; G05D 1/0282; G05D 1/0297; G05D 2201/0216
See application file for complete search history.

(56) References Cited

U.S. PATENT DOCUMENTS

| 2011/0166737 | A1* | 7/2011 | Tanaka | G05D 1/0217 |
| 2019/0070911 | A1* | 3/2019 | Tsujita et al. | B60C 23/0416 |
| 2019/0187698 | A1* | 6/2019 | Jacquemart | G05D 1/0027 |
| 2019/0325546 | A1* | 10/2019 | Hagestad | G06Q 10/06315 |

FOREIGN PATENT DOCUMENTS

| CN | 106168802 A | * | 11/2016 | | G05D 1/02 |
| JP | 5807990 B2 | | 9/2015 | | |
| JP | 2017-199094 A | | 11/2017 | | |
| JP | 6627487 B2 | | 1/2020 | | |
| KR | 100645816 B1 | * | 11/2006 | | B25J 11/0085 |
| WO | 2013/044069 A1 | | 3/2013 | | |
| WO | WO-2013119942 A1 | * | 8/2013 | | G05D 1/0274 |

OTHER PUBLICATIONS

Internet Archives, Wikipedia Sama Tools, Rotational Abrasion Tester, accessed Jan. 16, 2021 (Year: 2021).*

* cited by examiner

*Primary Examiner* — Anne Marie Antonucci
*Assistant Examiner* — Kirsten Jade M Santos
(74) *Attorney, Agent, or Firm* — Sughrue Mion, PLLC (57) ABSTRACT

A robot control system is a robot control system that controls a plurality of mobile robots, in which: each of the mobile robots includes right and left wheels, and a sensor that detects actions of the right and left wheels; and the control system calculates abrasion degrees of right and left components for the right and left wheels, depending on a detection result of the sensor, and manages traveling of the plurality of mobile robots, depending on the abrasion degrees.

5 Claims, 8 Drawing Sheets

MOBILE ROBOT

CROSS-REFERENCE TO RELATED APPLICATION

This application claims priority to Japanese Patent Application No. 2021-068317 filed on Apr. 14, 2021, incorporated herein by reference in its entirety.

BACKGROUND

1. Technical Field

The present disclosure relates to a robot control system, a robot control method, a program and an autonomous mobile robot.

2. Description of Related Art

Japanese Patent No. 5807990 discloses a control system that controls a plurality of robots.

SUMMARY

In such a control system, it is desirable to control robots more efficiently. Depending on, for example, the operating time of each robot, maintenance is performed to the robot. Specifically, in the case where the robot is a mobile robot that includes right and left wheels, it is necessary to replace the wheels depending on the attrition of the wheels.

In the case where the attrition of only one of the right and left wheels is large, only the wheel with large attrition is replaced. That is, when the replacement timing is different between the right and left wheels, the number of maintenances increases. Further, when the wheel with large attrition and the wheel with small attrition are concurrently replaced, the wheel with small attrition is needlessly discarded.

A robot control system according to the embodiment is a robot control system that controls a plurality of mobile robots, in which: each of the mobile robots includes right and left wheels, and a sensor that detects actions of the right and left wheels; and the robot control system calculates abrasion degrees of right and left components for the right and left wheels, depending on a detection result of the sensor, and manages traveling of the plurality of mobile robots, depending on the abrasion degrees.

The above robot control system may manage the traveling so as to eliminate a right-left difference between the abrasion degrees of each of the mobile robots.

The mobile robot may be a mobile robot that carries a carried object, and the above robot control system may decide a mobile robot that carries the carried object, depending on a movement path from a carrying start place of the carried object to a carrying goal place of the carried object.

The above robot control system may decide the mobile robot that carries the carried object, depending on positions of the plurality of mobile robots, the carrying start place of the carried object, and the carrying goal place of the carried object.

The above robot control system may tentatively decide a movement path from a current position of the mobile robot through the carrying start place of the carried object to the carrying goal place of the carried object, and the above robot control system may select the mobile robot that carries the carried object, based on the tentatively decided movement path.

A robot control method according to an embodiment is a robot control method for controlling a plurality of mobile robots, in which: each of the mobile robots includes right and left wheels, and a sensor that detects actions of the right and left wheels; and the robot control method includes a step of calculating abrasion degrees of right and left components for the right and left wheels, depending on a detection result of the sensor, and a step of managing traveling of the plurality of mobile robots, depending on the abrasion degrees.

In the above robot control method, the traveling may be managed such that a right-left difference between the abrasion degrees of each of the mobile robots is eliminated.

In the above robot control method, the mobile robot may be a mobile robot that carries a carried object, and a mobile robot that carries the carried object may be decided depending on a movement path from a carrying start place of the carried object to a carrying goal place of the carried object.

In the above robot control method, the mobile robot that carries the carried object may be decided depending on positions of the plurality of mobile robots, the carrying start place of the carried object, and the carrying goal place of the carried object.

In the above robot control method, a movement path from a current position of the mobile robot through the carrying start place to the carrying goal place may be tentatively decided, and the mobile robot that carries the carried object may be selected based on the tentatively decided movement path.

A program according to an embodiment is a program that causes a computer to execute a robot control method for controlling a plurality of mobile robots, in which: each of the mobile robots includes right and left wheels, and a sensor that detects actions of the right and left wheels; and the robot control method includes a step of calculating abrasion degrees of right and left components for the right and left wheels, depending on a detection result of the sensor, and a step of managing traveling of the plurality of mobile robots, depending on the abrasion degrees.

In the above program, the traveling may be managed such that a right-left difference between the abrasion degrees of each of the mobile robots is eliminated.

In the above program, the mobile robot may be a mobile robot that carries a carried object, and a mobile robot that carries the carried object may be decided depending on a movement path from a carrying start place of the carried object to a carrying goal place of the carried object.

In the above program, the mobile robot that carries the carried object may be decided depending on positions of the plurality of mobile robots, the carrying start place of the carried object, and the carrying goal place of the carried object.

In the above program, a movement path from a current position of the mobile robot through the carrying start place to the carrying goal place may be tentatively decided, and the mobile robot that carries the carried object may be selected based on the tentatively decided movement path.

An autonomous mobile robot according to an embodiment includes: right and left wheels; a sensor that detects actions of the right and left wheels; an abrasion degree calculation unit that calculates abrasion degrees of right and left components for the right and left wheels, depending on a detection result of the sensor; and a computation processing unit that decides a movement path to a destination, depending on the abrasion degrees.

In the above autonomous mobile robot, the computation processing unit may decide the movement path so as to eliminate a right-left difference between the abrasion degrees.

The present disclosure makes it possible to provide a robot control system, a robot control method, a program, an autonomous mobile robot and the like that allow a mobile robot to be efficiently controlled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure will be described below based on an embodiment of the present disclosure. The disclosure according to the claims is not limited to the embodiment described below. Further, all constituents described in the embodiment are not essential as means for solving the problem.

Schematic Configuration

Figure 1:
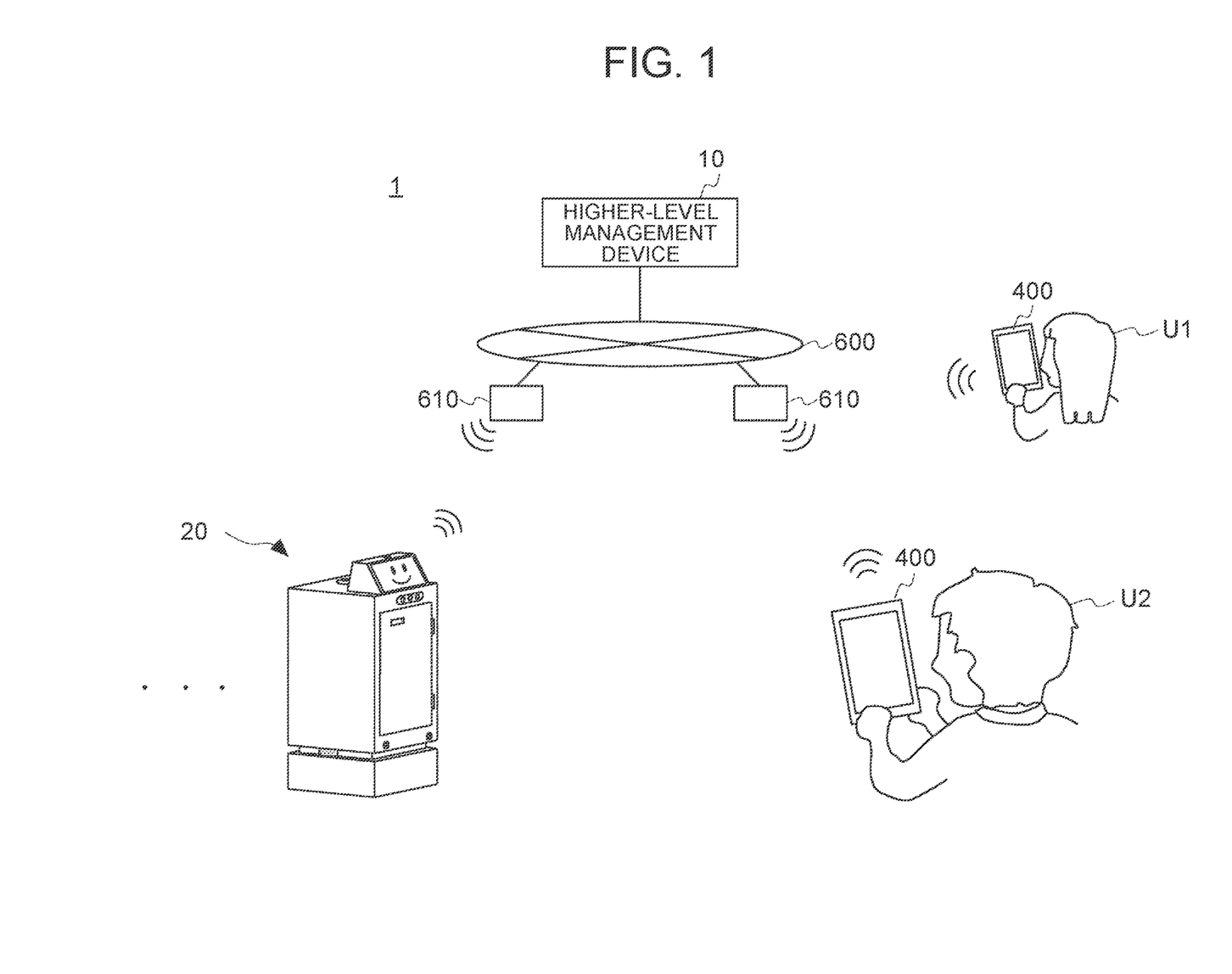
FIG. 1 is a conceptual diagram for describing a whole configuration of a system in which a mobile robot according to an embodiment is used.

FIG. 1 is a conceptual diagram for describing a whole configuration of a system 1 in which a mobile robot 20 according to the embodiment is used. For example, the mobile robot 20 is a carrying robot that executes the carrying of a carried object as a task. The mobile robot 20 autonomously travels for carrying the carried object, in a medical and welfare facility such as a hospital, a rehabilitation center, a nursing home and an elderly facility. Further, the system according to the embodiment can be used also in a commercial facility such as a shopping mall, and other facilities.

A user U1 puts the carried object in the mobile robot 20, and requests the carrying of the carried object. The mobile robot 20 autonomously moves to a set destination, to carry the carried object. That is, the mobile robot 20 executes a carrying task (also referred to as merely a task hereinafter) for an item. In the following description, a place at which the carried object is loaded is referred to as a carrying start place, and a place to which the carried object is delivered is referred to as a carrying goal place.

For example, suppose that the mobile robot 20 moves in a general hospital having a plurality of diagnosis and treatment departments. The mobile robot 20 carries appointments, consumption articles, medical appliances and others among the plurality of diagnosis and treatment departments. For example, the mobile robot delivers the carried object from a nurse station of a certain diagnosis and treatment department to a nurse station of another diagnosis and treatment department. Alternatively, the mobile robot 20 delivers the carried object from a storage room for appointments and medical appliances to a nurse station of a diagnosis and treatment department. Further, the mobile robot 20 delivers a medicine dispensed in a dispensing department, to a diagnosis and treatment department or a patient that uses the medicine.

Examples of the carried object include consumption articles such as a drug and a bandage, and appointments such as a specimen, an inspection instrument, a medical instrument, a hospital diet and a stationary. Examples of the medical instrument include a blood pressure manometer, a blood transfusion pump, a syringe pump, a foot pump, a nurse call button, a bed leaving sensor, a low-pressure continuous suction apparatus, an electrocardiograph monitor, a medicine infusion controller, an enteral feeding pump, an artificial respirator, a cuff pressure meter, a touch sensor, an aspirator, a nebulizer, a pulse oximeter, a resuscitator, an aseptic apparatus, and an echo spectrometer. Further, the mobile robot 20 may carry a diet such as a hospital diet and an examination diet. Furthermore, the mobile robot 20 may carry an apparatus after use, a dish after eating, or the like. In the case where the carrying goal place is on a different floor, the mobile robot 20 may move using an elevator or the like.

The system 1 includes the mobile robot 20, a higher-level management device 10, a network 600, communication units 610, and user terminals 400. The user U1 or a user U2 can perform a carrying request for the carried object, using user terminals 400. Examples of the user terminal 400 include a tablet computer and a smartphone. The user terminal 400 only needs to be an information processing device that can perform communication by wireless or by wire.

In the embodiment, the mobile robot 20 and the user terminal 400 are connected with the higher-level management device 10 through the network 600. The mobile robot 20 and the user terminal 400 are connected with the network 600 through the communication unit 610. The network 600 is a wired or wireless local area network (LAN) or wide area network (WAN). Furthermore, the higher-level management device 10 is connected with the network 600 by wire or by wireless. For example, each communication unit 610 is a wireless LAN unit that is installed in the environment. For example, the communication unit 610 may be a general-purpose communication device such as a Wi-Fi router.

Various signals transmitted from the user terminals 400 of the users U1, U2 are once sent to the higher-level management device 10 through the network 600, and are transferred from the higher-level management device 10 to mobile robots 20 that are targets. Similarly, various signals transmitted from mobile robots 20 are once sent to the higher-level management device 10 through the network 600, and are transferred from the higher-level management device 10 to user terminal 400 that are targets. The higher-level management device 10 is a server that is connected with apparatuses, and collects data from the apparatuses. Further, the higher-level management device 10 is not limited to a physically single device, and may include a plurality of devices that perform distributed processing. Further, the higher-level management device 10 may be disposed so as to be distributed in edge devices such as the mobile robot 20. For example, a part or whole of the system 1 may be mounted on the mobile robot 20.

The user terminal 400 and the mobile robot 20 may exchange signals without the higher-level management device 10. For example, the user terminal 400 and the mobile robot 20 may directly exchange signals by wireless communication. Alternatively, the user terminal 400 and the mobile robot 20 may exchange signals through the communication unit 610.

The user U1 or user U2 requests the carrying of the carried object using the user terminal 400. Hereinafter, descriptions will be made assuming that the user U1 is a carrying requester at the carrying start place and the user U2 is a scheduled receiver at the carrying goal place (destination). Needless to say, the user U2 at the carrying goal place may perform the carrying request. Further, a user at a place other than the carrying start place and the carrying goal place may perform the carrying request.

In the case where the user U1 performs the carrying request, the user U1 inputs a content of the carried object, an acceptance place (also referred to as a carrying start place, hereinafter) for the carried object, a delivery place (also referred to as a carrying goal place, hereinafter) for the carried object, a scheduled arrival hour (an acceptance hour for the carried object) at the carrying start place, a scheduled arrival time (a carrying term) at the carrying goal place, and others, using the user terminal 400. Hereinafter, the information is also referred to as carrying request information. The user U1 can input the carrying request information by operating a touch panel of the user terminal 400. The carrying start place may be a place where the user U1 is, or may be a storage place for the carried object, or the like. The carrying goal place is a place where the user U2 or patient that will use the carried object is.

The user terminal 400 sends the carrying request information input by the user U1, to the higher-level management device 10. The higher-level management device 10 is a management system that manages a plurality of mobile robots 20. The higher-level management device 10 sends an action command for executing the carrying task, to the mobile robot 20. For each carrying request, the higher-level management device 10 decides the mobile robot 20 that executes the carrying task. Then, the higher-level management device 10 sends control signal including the action command, to the mobile robot 20. The mobile robot 20 moves so as to arrive at the carrying goal place from the carrying start place, in accordance with the action command.

For example, the higher-level management device 10 assigns the carrying task to the mobile robot 20 at the carrying start place or the mobile robot 20 at the vicinity of the carrying start place. Alternatively, the higher-level management device 10 assigns the carrying task to the mobile robot 20 at the carrying start place or the mobile robot 20 that is moving to the vicinity of the carrying start place. The mobile robot 20 to which the task is assigned moves to the carrying start place, to take the carried object. For example, the carrying start place is a place where the user U1 that requests the task is.

When the mobile robot 20 arrives at the carrying start place, the user U1 or another staff places the carried object on the mobile robot 20. The mobile robot 20 in which the carried object is loaded autonomously moves toward the carrying goal place. The higher-level management device 10 sends a signal to the user terminal 400 of the user U2 at the carrying goal place. Thereby, the user U2 can know that the carried object is being carried, and can know the scheduled arrival time. When the mobile robot 20 arrives at the set carrying goal place, the user U2 can receive the carried object contained in the mobile robot 20. In this way, the mobile robot 20 executes the carrying task.

In the above whole configuration, the control system can be built as a whole while elements of the control system are distributed to the mobile robot 20, the user terminal 400 and the higher-level management device 10. Further, the control system can be built while substantive elements for realizing the carrying of the carried object are concentrated in one device. The higher-level management device 10 controls one or a plurality of mobile robots 20.

Control Block Diagram

Figure 2:
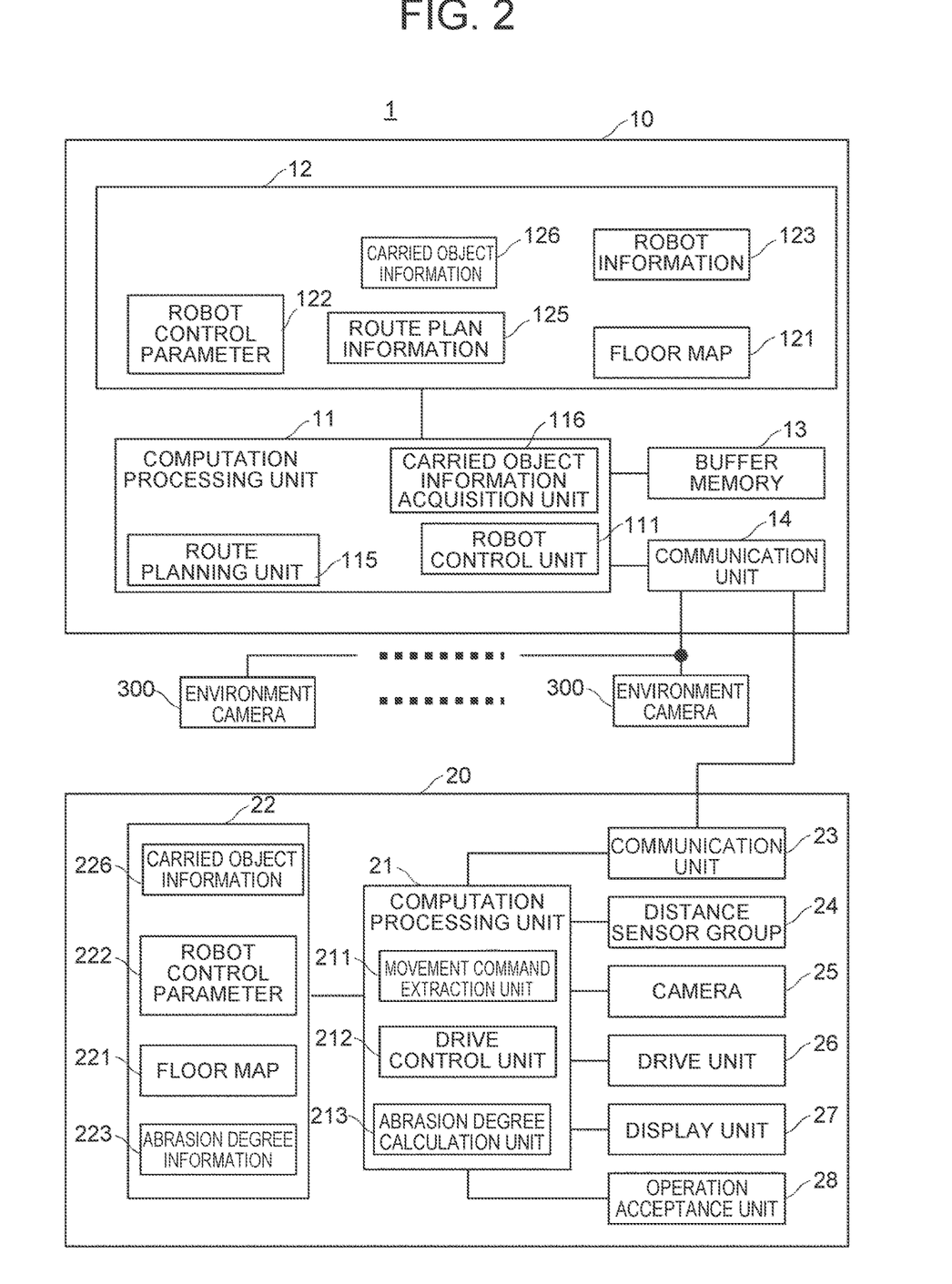
FIG. 2 is a control block diagram of a control system according to the embodiment.

FIG. 2 shows a control block diagram showing a controlling system of the system 1. As shown in FIG. 2, the system 1 includes the higher-level management device 10, the mobile robot 20, and environment cameras 300.

The system 1 efficiently controls a plurality of mobile robots 20, while causing the mobile robots 20 to autonomously move in a predetermined facility. Therefore, a plurality of environment cameras 300 is installed in the facility. The environment cameras 300 are installed in, for example, peripheries of a passage, a hall, an elevator, an entrance door and a security gate in the facility.

The environment camera 300 acquires an image of a range in which the mobile robot 20 moves. In the system 1, the image acquired by the environment camera 300 and information based on the image are collected by the higher-level management device 10. Alternatively, the image acquired by the environment camera 300 and the like may be directly sent to the mobile robot. The environment camera 300 may be a monitoring camera or the like that is provided at the passage or entrance door in the facility. The environment camera 300 may be used for evaluating a distribution of a congestion situation in the facility.

In the system 1 according to the embodiment, the higher-level management device 10 makes a route plan based on the carrying request information. The higher-level management device 10 gives an instruction about a movement place to a corresponding mobile robot 20, based on the made route plan information. Then, the mobile robot 20 autonomously moves toward the movement place designated by the higher-level management device 10. The mobile robot 20 autonomously moves toward the movement place (destination), using sensors provided in the mobile robot 20, a floor map, position information and others.

For example, the mobile robot 20 travels so as not to come into contact with an apparatus, a physical body, a wall and a human (collectively referred to as a peripheral physical body, hereinafter) at the periphery. Specifically, the mobile robot 20 detects the distance to the peripheral physical body, and travels so as to be a certain distance (referred to as a threshold distance) or longer away from the peripheral physical body. When the distance to the peripheral physical body becomes the threshold distance or shorter, the mobile robot 20 decelerates or stops. Thereby, the mobile robot 20 can travel without coming into contact with the peripheral physical body. Since the contact can be avoided, a safe and efficient carrying can be performed. The threshold distance is a predetermined distance that is set such that each mobile robot can safely travel.

The higher-level management device 10 includes a computation processing unit 11, a storage unit 12, a buffer memory 13, and a communication unit 14. The computation processing unit 11 performs computations for controlling and managing the mobile robot 20. The computation processing unit 11 can be implemented as a device that can execute programs, for example, as a central processing unit (CPU) of a computer. Further, various functions may be realized by programs. FIG. 2 shows only a robot control unit 111, a route planning unit 115 and a carried object information acquisition unit 116, which are characteristic processing blocks in the computation processing unit 11, but other processing blocks are also included.

The robot control unit 111 performs a computation for remotely controlling the mobile robot 20, and generates a control signal. The robot control unit 111 generates the control signal based on, for example, route plan information 125 described later. Furthermore, the robot control unit 111 generates the control signal based on a variety of information obtained from the environment camera 300 and the mobile robot 20. The control signal may include update information such as a floor map 121, robot information 123 and a robot control parameter 122, which are described later. That is, in the case where the variety of information is updated, the robot control unit 111 generates the control signal depending on the update information.

The carried object information acquisition unit 116 acquires information relevant to the carried object. The carried object information acquisition unit 116 acquires information relevant to the content (type) of the carried object that is being carried by the mobile robot 20.

The route planning unit 115 makes a route plan for each mobile robot 20. When the carrying task is input, the route planning unit 115 makes a route plan for carrying the carried object to the carrying goal place (destination), based on the carrying request information. Specifically, the route planning unit 115 refers to the route plan information 125, robot information 123 and others that have been already stored in the storage unit 12, and decides the mobile robot 20 that executes the new carrying task. The departure place is the current position of the mobile robot 20, the carrying goal place in the last carrying task, the acceptance place of the carried object, or the like. The destination is the carrying goal place for the carried object, a waiting place (waiting area), a charge place or the like.

The route planning unit 115 sets passing points from the departure place of the mobile robot 20 to the destination of the mobile robot 20. The route planning unit 115 sets a passing order of the passing points for each mobile robot 20. For example, the passing point is set at a branching point, a crossing point, a lobby in front of an elevator, and peripheries of them. Further, on a passage having a narrow width, it is sometimes difficult for mobile robots 20 to pass each other. In this case, a point immediately in front of the passage having a narrow width may be set as the passing point. Candidates of the passing point may be previously registered in the floor map 121.

The route planning unit 115 decides mobile robots 20 that perform carrying tasks, from the plurality of mobile robots 20, such that the tasks can be executed efficiently as the whole system. The route planning unit 115 preferentially assigns the carrying task to a mobile robot 20 in a waiting state or a mobile robot 20 close to the carrying start place.

The route planning unit 115 sets the passing point including a departure place and a destination, for the mobile robot 20 to which the carrying task is assigned. For example, in the case where there are two or more movement paths from the carrying start place to the carrying goal place, the passing point is set such that the mobile robot 20 can move in the shortest time. Therefore, the higher-level management device 10 updates information indicating the congestion situation of the passage, based on an image of a camera or the like. Specifically, a place where other mobile robots 20 pass or a place where there are many people has a high congestion degree. Accordingly, the route planning unit 115 sets the passing point such that a place having a high congestion degree is avoided.

The mobile robot 20 can sometimes move to the destination both through a counterclockwise movement path and through a clockwise movement path. In this case, the route planning unit 115 sets the passing point such that the mobile robot 20 passes through the movement path having a lower congestion degree. Alternatively, the route planning unit 115 sets the passing point based on an abrasion degree described later. The route planning unit 115 sets one or a plurality of passing points in a range to the destination, and thereby the mobile robot 20 can move along a movement path that is not congested. For example, in the case where the passage is divided at a branching point or a crossing point, the route planning unit 115 sets the passing point to the branching point, the crossing point, the corner and peripheries of them, when appropriate. Thereby, the carrying efficiency can be improved.

The route planning unit 115 may set the passing point in consideration of the congestion situation of the elevator, movement distance and others. Furthermore, the higher-level management device 10 may estimate the number of mobile robots 20 and the number of people, at an hour when the mobile robot 20 is scheduled to pass through a certain place. Then, the route planning unit 115 may set the passing point depending on the estimated congestion situation. Further, the route planning unit 115 may dynamically change the passing point depending on the change in congestion situation. The route planning unit 115 sets the passing point in order for the mobile robots 20 to which the carrying task is assigned. The passing point may include the carrying start place and the carrying goal place. As described later, the mobile robot 20 autonomously moves so as to passes through the passing points set by the route planning unit 115, in order.

The storage unit 12 is a storage unit in which information necessary for the management and control of the robot is stored. In the example of FIG. 2, the floor map 121, the robot information 123, the robot control parameter 122, the route plan information 125 and carried object information 126 are shown, but other information may be stored in the storage unit 12. The computation processing unit 11 performs computations using the information stored in the storage unit 12, when various processes are performed. Further, a variety of information stored in the storage unit 12 can be updated to the latest information.

The floor map 121 is map information about the facility in which the mobile robot 20 moves. The floor map 121 may be previously made information, may be information generated from information obtained from the mobile robot 20, or may be information resulting from adding map modification information generated from the information obtained from the mobile robot 20 to previously made base map.

The robot information 123 includes the ID, model number, specification and others of the mobile robot 20 that is managed by the higher-level management device 10. The robot information 123 may include position information indicating the current position of the mobile robot 20. The robot information 123 may include information indicating whether the mobile robot 20 is executing the task or is in the waiting state. Further, the robot information 123 may include information indicating whether the mobile robot 20 is in operation or is out of order. Further, the robot information 123 may include information about carried objects that can be carried and information about carried objects that cannot be carried. The robot information 123 may include information about the horizontal size of the mobile robot 20.

The robot information 123 may include information indicating the abrasion degree of a wheel. The robot information 123 may include the abrasion degrees of right and left wheels of the mobile robot 20. For example, the information indicating the abrasion degree of the wheel is the integrated value of the number of rotations of the wheel. The robot information 123 may be updated depending on the movement of the mobile robot 20. The robot information 123 includes the abrasion degree for each mobile robot 20. Furthermore, the robot information 123 includes the abrasion degree of the left wheel and the abrasion degree of the right wheel for each mobile robot 20.

The robot control parameter 122 includes control parameters such as the threshold distance from the peripheral physical body about the mobile robot 20 that is managed by the higher-level management device 10. The threshold distance is a margin distance for avoiding the contact with the peripheral physical body including a human. Furthermore, the robot control parameter 122 may include information relevant to action capability such as an upper speed limit of the movement speed of the mobile robot 20.

A plurality of threshold distances and a plurality of upper speed limits may be set in the robot control parameter 122. The higher-level management device 10 may alter the threshold distance and the upper speed limit when appropriate. For example, the threshold distance and the upper speed limit may be set in a stepwise manner. Further, the threshold distance and upper speed limit set in a stepwise manner may be associated. For example, in the case of a high-speed mode in which the upper speed limit is high, urgent stop or deceleration is difficult, and therefore the threshold distance is set to a large value. In the case of a low-speed mode in which the upper speed limit is low, the urgent stop or deceleration is easy, and therefore the threshold distance is set to a small value. In this way, the threshold distance may vary depending on the upper speed limit. The computation processing unit 11 may alter the upper speed limit and the like depending on the carried object information or environment information. The higher-level management device 10 selects the upper speed limit and the threshold distance from the robot control parameter, depending on the environment or situation. In the case where the higher-level management device 10 updates the upper speed limit and the threshold distance, the higher-level management device 10 sends the updated data to the mobile robot 20.

The robot control parameter 122 may be updated depending on the situation. The robot control parameter 122 may include information indicating a vacancy state or use state about a containing space of a containing chamber 291. The robot control parameters 122 may include information about carried objects that can be carried and information about carried objects that cannot be carried. The above various pieces of the information of the robot control parameter 122 are associated to each mobile robot 20.

The route plan information 125 includes the route plan information that is planned by the route planning unit 115. For example, the route plan information 125 includes information indicating the carrying task. The route plan information 125 may include information such as the ID of the mobile robot 20 to which the task is assigned, the departure place, the content of the carried object, the carrying goal place, the carrying start place, the scheduled arrival time at the carrying goal place, the scheduled arrival time at the carrying start place, and the arrival term. In the route plan information 125, the above various pieces of the information may be associated for each carrying task. The route plan information 125 may include at least a part of the carrying request information input from the user U1.

Furthermore, the route plan information 125 may include information relevant to the passing point about each mobile robot 20 and the carrying task. For example, the route plan information 125 includes information indicating the passing order of the passing points for each mobile robot 20. The route plan information 125 may include the coordinates of each passing point on the floor map 121, and information indicating whether the mobile robot 20 has passed through the passing point.

The carried object information 126 is information relevant to the carried object for which the carrying request is performed. For example, the carried object information includes information such as the content (type) of the carried object, the carrying start place and the carrying goal place. The carried object information 126 may include the ID of the mobile robot 20 that executes the carrying. Furthermore, the carried object information may include information indicating a status such as a status where the carrying is being performed, a status where the carrying is not started (the carried object is not loaded) and a status where the carrying is completed. In the carried object information 126, the pieces of the information are associated for each carried object. The carried object information 126 will be described later.

The route planning unit 115 designs the route plan by referring to a variety of information stored in the storage unit 12. For example, the route planning unit 115 decides the mobile robot 20 that executes the task, based on the floor map 121, the robot information 123, the robot control parameter 122 and the route plan information 125. Then, the route planning unit 115 sets the passing point to the carrying goal place and the passing order, by referring to the floor map 121 and the like. In the floor map 121, candidates of the passing point are previously registered. The route planning unit 115 sets the passing point depending on the congestion situation and the like. Further, for example, in the case of continuous processing of tasks, the route planning unit 115 sets the carrying start place and the carrying goal place, as the passing point.

One carrying task may be assigned to two or more mobile robots 20. For example, in the case where the carried object is larger than a carrying-possible volume of the mobile robot 20, one carried object is divided into two carried objects, to be loaded in the two mobile robots 20. Alternatively, in the case where the carried object is heavier than a carrying-possible weight of the mobile robot 20, one carried object is divided into two carried objects, to be loaded in the two mobile robots 20. Thereby, one carrying task can be executed by two or more mobile robots 20 in cooperation. Needless to say, in the case where mobile robots 20 having different sizes are controlled, the route plan may be made such that a mobile robot 20 that can carry the carried object accepts the carried object.

Furthermore, one mobile robot 20 may perform two or more carrying tasks in parallel. For example, one mobile robot 20 may concurrently accept two or more carried objects, and may carry the carried objects to different carrying goal places in sequence. Alternatively, while one mobile robot 20 is carrying one carried object, the mobile robot 20 may accept another carried object. Further, the carrying goal places of carried objects loaded at different places may be identical, or may be different. Thereby, tasks can be efficiently executed.

In this case, the containing information indicating the use state or vacancy state about the containing space of the mobile robot 20 may be updated. That is, the higher-level management device 10 may control the mobile robot 20 while managing the containing information indicating the vacancy state. For example, when the loading or receiving of the carried object is completed, the containing information is updated. When the carrying task is input, the higher-level management device 10 decides a mobile robot 20 that has a space allowing the carried object to be loaded, by referring to the containing information, and causes the mobile robot 20 to move for accepting the carried object. Thereby, one mobile robot 20 can concurrently execute a plurality of carrying tasks, and two or more mobile robots 20 can execute the carrying task in cooperation. For example, the vacancy state may be detected by installing a sensor in the containing space of the mobile robot 20. Further, for each carried object, the volume and the weight may be previously registered.

The buffer memory 13 is a memory in which intermediate information generated in processing by the computation processing unit 11 is accumulated. The communication unit 14 is a communication interface for communicating with a plurality of environment cameras 300 provided in the facility in which the system 1 is used and at least one mobile robot 20. The communication unit 14 can perform both wired communication and wireless communication. For example, to each mobile robot 20, the communication unit 14 sends a control signal necessary for the control of the mobile robot 20. Further, the communication unit 14 receives information collected by the mobile robots 20 and the environment cameras 300.

The mobile robot 20 includes a computation processing unit 21, a storage unit 22, a communication unit 23, a proximity sensor (for example, a distance sensor group 24), a camera 25, a drive unit 26, a display unit 27, and an operation acceptance unit 28. FIG. 2 shows only typical processing blocks that are included in the mobile robot 20, but although not illustrated, many other processing blocks are also included in the mobile robot 20.

The communication unit 23 is a communication interface for communicating with the communication unit 14 of the higher-level management device 10. For example, the communication unit 23 communicates with the communication unit 14 using a wireless signal. For example, the distance sensor group 24 is a proximity sensor, and outputs proximal object distance information indicating the distance from an object or human around the mobile robot 20. For example, the camera 25 photographs an image for grasping the situation around the mobile robot 20. Further, for example, the camera 25 can also photograph a positional marker provided on a ceiling or the like of the facility. The mobile robot 20 may grasp its own position using the positional marker.

The drive unit 26 drives drive wheels equipped in the mobile robot 20. The drive unit 26 may include an encoder or the like that detects the number of rotations of the drive wheel or a drive motor of the drive wheel. Its own position (the current position) may be estimated depending on the output of the encoder. The mobile robot 20 detects its current position, and sends the current position to the higher-level management device 10.

The display unit 27 and the operation acceptance unit 28 are realized by a touch panel display. The display unit 27 displays a user interface screen that is the operation acceptance unit 28. Further, the display unit 27 may display the movement place of the mobile robot 20 or information indicating the state of the mobile robot 20. The operation acceptance unit 28 accepts an operation from the user. The operation acceptance unit 28 includes various switches provided on the mobile robot 20, in addition to the user interface screen displayed on the display unit 27.

The computation processing unit 21 performs computations that are used for the control of the mobile robot 20. The computation processing unit 21 can be implemented as a device that can execute programs, for example, as a central processing unit (CPU) of a computer. Further, various functions may be realized by programs. The computation processing unit 21 includes a movement command extraction unit 211, a drive control unit 212 and an abrasion degree calculation unit 213. FIG. 2 shows only typical processing blocks that are included in the computation processing unit 21, but unillustrated processing blocks are also included. The computation processing unit 21 may search a path between passing points.

The movement command extraction unit 211 extracts a movement command from the control signal given from the higher-level management device 10. For example, the movement command includes information relevant to the next passing point. For example, the control signal may include information relevant to the coordinates of passing points and the passing order of the passing points. The movement command extraction unit 211 extracts the information as the movement command.

Furthermore, the movement command may include information indicating that the movement to the next passing point is possible. When the width of a passage is narrow, mobile robots 20 cannot pass each other, in some cases. Further, the mobile robot 20 cannot temporarily pass, in some cases. In such cases, the control signal includes a command to stop the mobile robot 20 at a passing point immediately in front of a place where the mobile robot 20 should stop. Then, after another mobile robot 20 passes or after the passing becomes possible, the higher-level management device 10 outputs a control signal for informing the mobile robot 20 that the movement is possible. Thereby, the mobile robot 20 temporarily stopped restarts the movement.

The drive control unit 212 controls the drive unit 26 such that the mobile robot 20 moves based on the movement command given from the movement command extraction unit 211. For example, the drive unit 26 includes drive wheels that rotates depending on a control command value from the drive control unit 212. The movement command extraction unit 211 extracts the movement command, such that the mobile robot 20 moves toward the passing point received from the higher-level management device 10. Then, the drive unit 26 drives and rotates the drive wheels. The mobile robot 20 autonomously moves toward the next passing point. In this way, the mobile robot 20 passes through passing points in order, and arrives at the carrying goal place. Further, the mobile robot 20 may estimate its own position, and may send a signal indicating that the mobile robot 20 has passed through the passing point, to the higher-level management device 10. Thereby, the higher-level management device 10 can manage the current position and carrying state of each mobile robot 20.

The abrasion degree calculation unit 213 calculates the abrasion degrees of the right and left wheels (drive wheels). As described later, the drive unit 26 of the mobile robot 20 is provided with an encoder for a drive motor. The encoder detects rotation information indicating the rotation angle, rotation speed and others of the wheel. The abrasion degree calculation unit 213 detects the number of rotations of the wheel, based on a signal from the encoder. The abrasion degree calculation unit 213 calculates the integrated value of the number of rotations as the abrasion degree.

In the storage unit 22, a floor map 221, a robot control parameter 222 and carried object information 226 are stored. FIG. 2 shows a part of information stored in the storage unit 22, and the storage unit 22 contains information other than the floor map 221, robot control parameter 222 and carried object information 226 shown in FIG. 2. The floor map 221 is map information about the facility where the mobile robot 20 moves. For example, the floor map 221 is information resulting from downloading the floor map 121 of the higher-level management device 10. The floor map 221 may be previously made information. Further, the floor map 221 may be map information partially including a region where the mobile robot 20 is scheduled to move, instead of map information about the whole facility.

The robot control parameter 222 is a parameter for causing the mobile robot 20 to act. For example, the robot control parameter 222 includes the threshold distance from the peripheral physical body. Furthermore, the robot control parameter 222 includes the upper speed limit of the mobile robot 20. When the mobile robot 20 receives the robot control parameter 122 updated in the higher-level management device 10, the data about the robot control parameter 222 is updated.

The threshold distance may be controlled so as to change in a stepwise manner depending on the movement speed, during the movement of the mobile robot. For example, in the case where the speed of the mobile robot 20 becomes high by acceleration, the threshold distance is increased. That is, in the case where the speed of the mobile robot 20 exceeds a speed threshold, the threshold distance is increased. In the case where the mobile robot 20 moves at high speed, it is preferable to increase the threshold distance that is a margin distance, because the braking distance is long. Consequently, the threshold distance may vary between a case where the mobile robot 20 moves in the low-speed mode in which the speed is lower than the speed threshold and a case where the mobile robot 20 moves in the high-speed mode in which the speed is equal to or higher than the speed threshold. Needless to say, the threshold distance may be divided into three or more stages. For example, three stages of a high-speed mode, a middle-speed mode and a low-speed mode may be set, and different threshold distances may be set respectively. Further, the threshold distance is longer as the speed is higher. That is, the threshold distance is shortest in the mode in which the speed is lowest.

Abrasion degree information 223 is information indicating the abrasion degree calculated by the abrasion degree calculation unit 213. As described above, the abrasion degree information 223 is the integrated value of the number of rotations of the drive wheel.

The carried object information 226 includes information relevant to the carried object, similarly to the carried object information 126. The carried object information 226 includes information such as the content (type) of the carried object, the carrying start place and the carrying goal place. The carried object information may include information indicating the status such as the status where the carrying is being performed, the status where the carrying is not started (the carried object is not loaded) and the status where the carrying is completed. In the carried object information 226, the pieces of the information are associated for each carried object. The carried object information 226 will be described later. The carried object information 226 only needs to include information relevant to the carried object that is carried by the mobile robot 20. Accordingly, the carried object information 226 includes a part of the carried object information 126. That is, the carried object information 226 does not need to include information about the carrying of other mobile robots 20.

The drive control unit 212 refers to the robot control parameter 222, and stops or decelerates the action when the distance indicated by the distance information obtained from the distance sensor group 24 falls below the threshold distance. The drive control unit 212 controls the drive unit 26 such that the mobile robot 20 travels at a speed equal to or lower than the upper speed limit. The drive control unit 212 restricts the rotation speed of the drive wheel such that the mobile robot 20 does not move at a speed equal to or higher than the upper speed limit.

Configuration of Mobile Robot 20

Figure 3:
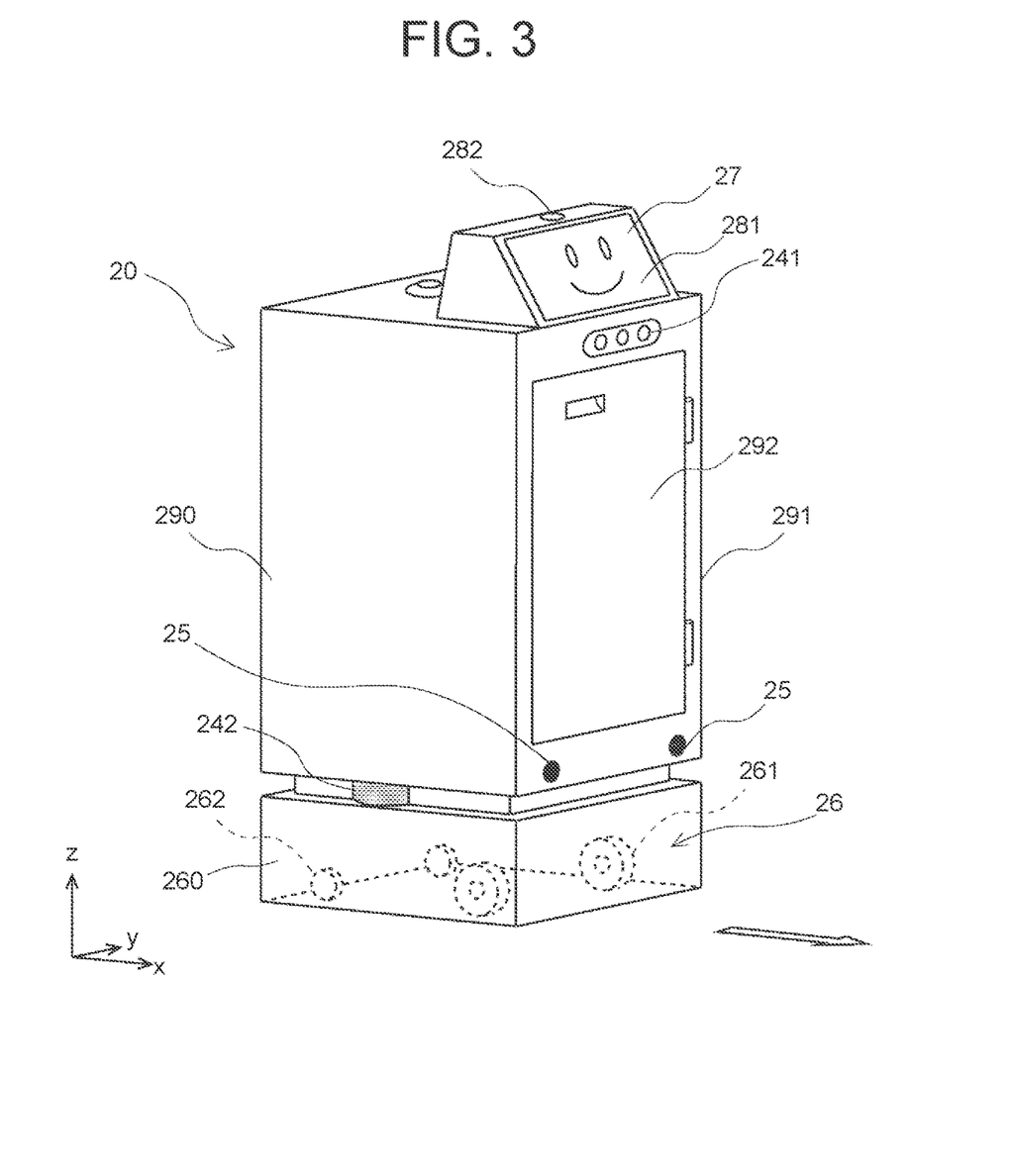
FIG. 3 is a schematic view showing an exemplary mobile robot.

An external appearance of the mobile robot 20 will be described. FIG. 3 is a schematic view of the mobile robot 20. The mobile robot 20 shown in FIG. 3 is an aspect of the mobile robot 20, and another form may be employed. In FIG. 3, the x-direction is the forward movement or rearward movement direction of the mobile robot 20, the y-direction is the right-left direction of the mobile robot 20, and the z-direction is the height direction of the mobile robot 20.

The mobile robot 20 includes a main body part 290 and a carriage part 260. The main body part 290 is mounted on the carriage part 260. Each of the main body part 290 and the carriage part 260 has a rectangular parallelepiped housing, and constituent elements are mounted within the housings. For example, the drive unit 26 is contained within the carriage part 260.

The main body part 290 is provided with the containing chamber 291 that is a containing space, and a door 292 that tightly closes the containing chamber 291. In the containing chamber 291, racks are provided at a plurality of stages, and the vacancy state is managed for each stage. For example, it is possible to update the vacancy state by disposing various sensors such as weight sensors at each stage. By autonomous movement, the mobile robot 20 carries the carried object contained in the containing chamber 291, to the destination designated by the higher-level management device 10. The main body part 290 may be equipped with an unillustrated control box or the like, in the housing. Further, the door 292 may be capable of being locked by an electronic key or the like. The user U2 unlocks the door 292 using an electronic key when the mobile robot 20 arrives at the carrying goal place. Alternatively, the door 292 may be automatically unlocked when the mobile robot 20 arrives at the carrying goal place.

As shown in FIG. 3, on an outer case of the mobile robot 20, a front-rear distance sensor 241 and a right-left distance sensor 242 are provided as the distance sensor group 24. The mobile robot 20 measures the distance to the peripheral physical body in the front-rear direction of the mobile robot 20, using the front-rear distance sensor 241. Further, the mobile robot 20 measures the distance to the peripheral physical body in the right-left direction of the mobile robot 20, using the right-left distance sensor 242.

For example, the front-rear distance sensor 241 is disposed on each of a front surface and rear surface of the housing of the main body part 290. The right-left distance sensor 242 is disposed on each of a left side surface and right side surface of the housing of the main body part 290. For example, each of the front-rear distance sensor 241 and the right-left distance sensor 242 is an ultrasonic distance sensor or a laser range finder. The distance to the peripheral physical body is detected. In the case where the distance to the peripheral physical body detected by the front-rear distance sensor 241 or right-left distance sensor 242 is equal to or shorter than the threshold distance, the mobile robot 20 decelerates or stops.

The drive unit 26 is provided with drive wheels 261 and casters 262. The drive wheels 261 are wheels for moving the mobile robot 20 forward, rearward, rightward and leftward. The casters 262, to which drive force is not given, are driven wheels that roll so as to follow the drive wheels 261. The drive unit 26 includes unillustrated drive motors, and drive the drive wheels 261.

For example, in the housing, the drive unit 26 supports two drive wheels 261 each of which contacts with a traveling surface and two casters 262 each of which contacts with the traveling surface. The two drive wheels 261 are provided such that the rotation axes coincide with each other. The drive wheels 261 are independently driven and rotated by unillustrated motors. The drive wheels 261 rotate depending on the control command value from the drive control unit 212 in FIG. 2. The casters 262, which are driven wheels, are provided such that a pivot shaft extending from the drive unit 26 in the vertical direction rotatably supports wheels so as to be away from a rotation shaft of the wheels, and moves so as to follow the movement direction of the drive unit 26.

For example, when the two drive wheels 261 are rotated at an identical rotation speed in an identical direction, the mobile robot 20 goes straight, and when the two drive wheels 261 are rotated at an identical rotation speed in opposite directions, the mobile robot 20 pivots around a vertical axis that passes through almost the center between the two drive wheels 261. Further, when the two drive wheels 261 are rotated at different rotation speeds in an identical direction, the mobile robot 20 can move while turning right or left. For example, when the rotation speed of the left drive wheel 261 is higher than the rotation speed of the right drive wheel 261, the mobile robot 20 can turn right. Conversely, when the rotation speed of the right drive wheel 261 is higher than the rotation speed of the left drive wheel 261, the mobile robot 20 can turn left. That is, the mobile robot 20 can perform moving in an arbitrary direction, pivoting, right or left turning, and the like, by controlling each of the rotation directions and rotation speeds of the two drive wheels 261.

Further, in the mobile robot 20, the display unit 27 and an operation interface 281 are provided on an upper surface of the main body part 290. The operation interface 281 is displayed on the display unit 27. When the user performs a touch operation to the operation interface 281 displayed on the display unit 27, the operation acceptance unit 28 can accept an instruction input from the user. Further, an emergency stop button 282 is provided on an upper surface of the display unit 27. The emergency stop button 282 and the operation interface 281 function as the operation acceptance unit 28.

The display unit 27 is a liquid crystal panel, for example. The display unit 27 displays the face of a character as an illustration, or presents information relevant to the mobile robot 20 as a text or an icon. When the face of a character is displayed on the display unit 27, it is possible to give an impression that the display unit 27 is a face-like portion, to an observer around the mobile robot 20. The display unit 27 and the like mounted on the mobile robot 20 can be used also as the user terminal 400.

The camera 25 is installed on the front surface of the main body part 290. In the embodiment, two cameras 25 function as a stereo camera. That is, two cameras 25 having an identical angular field are disposed so as to be away from each other in the horizontal direction. Images picked up by the respective cameras 25 are output as image data. The distance to a photographic subject and the size of the photographic subject can be calculated based on the image data of the two cameras 25. By analyzing the images picked up by the cameras 25, the computation processing unit 21 can detect a human, an obstacle or the like on the forward side of the mobile robot 20 in the movement direction. In the case where there is a human, an obstacle or the like on the forward side of the mobile robot 20 in the movement direction, the mobile robot 20 moves along the path while avoiding the human, the obstacle or the like. Further, the image data of the camera 25 is sent to the higher-level management device 10.

The mobile robot 20 recognizes the peripheral physical body and identifies its own position, by analyzing the image data output by the cameras 25 and the detection signals output by the front-rear distance sensor 241 and the right-left distance sensor 242. The cameras 25 pick up the forward view in the moving direction of the mobile robot 20. As illustrated, the forward side of the mobile robot 20 is defined as a side on which the cameras 25 are installed. That is, at the time of normal movement, as shown by an arrow, the forward side of the mobile robot 20 is a side in the moving direction.

Figure 4:
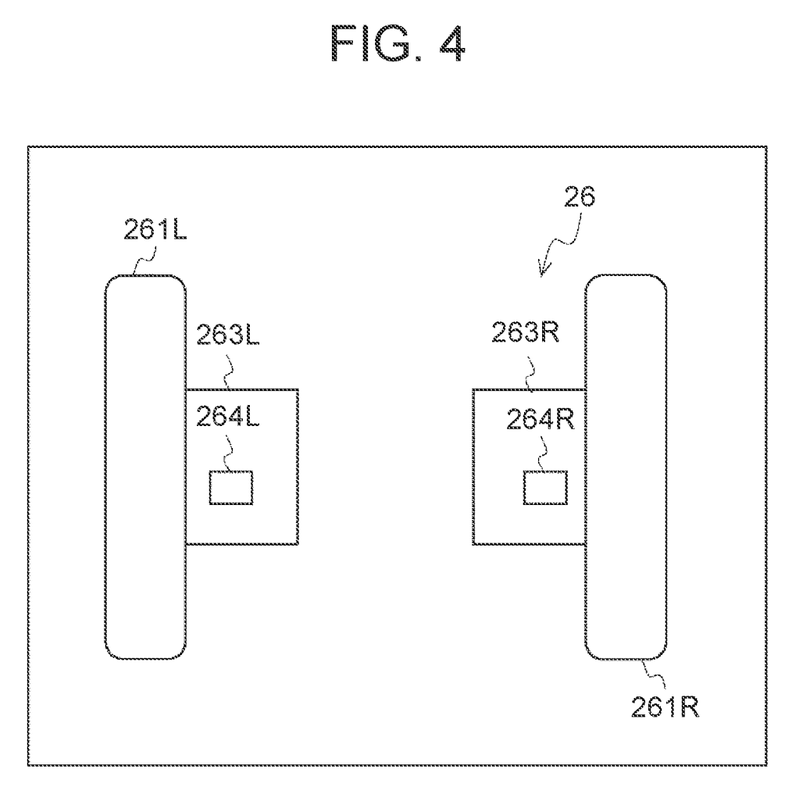
FIG. 4 is a schematic diagram showing a major configuration of a drive unit 26 of the mobile robot.

Next, a major configuration of the drive unit 26 will be described with use of FIG. 4. FIG. 4 is a diagram schematically showing the major configuration of the drive unit 26. For distinguishing the right and left drive wheels 261 shown in FIG. 3, the left drive wheel 261 is referred to as a drive wheel 261L, and the right drive wheel 261 is referred to as a drive wheel 261R. The drive unit 26 includes drive wheels 261L, 261R, motors 263L, 263R, and wheel sensors 264L, 264R. For simplification, the casters 262 and others are not illustrated.

The motor 263L is a drive mechanism that drives the drive wheel 261L. The motor 263R is a drive mechanism that drives the drive wheel 261R. For example, the motors 263L 263R are controlled such that the mobile robot 20 moves along the movement path to the destination. Specifically, the motors 263L, 263R are driven and rotated depending on the control command value from the drive control unit 212.

The wheel sensor 264L detects the action of the drive wheel 261L. The wheel sensor 264R detects the action of the drive wheel 261R. For example, the wheel sensor 264L and the wheel sensor 264R are encoders that are provided at the motor 263L and the motor 263R, respectively. For example, the wheel sensor 264L detects the rotation angle of the drive wheel 261L. The wheel sensor 264R detects the rotation angle of the drive wheel 261R. The current position of the mobile robot 20 on the floor map 221 may be evaluated by integrating the rotation numbers output from the wheel sensor 264L and the wheel sensor 264R.

Furthermore, the wheel sensors 264L, 264R output the detection results to the abrasion degree calculation unit 213 in FIG. 3. The abrasion degree calculation unit 213 calculates the abrasion degrees of components for the right and left wheels. Specifically, the abrasion degree calculation unit 213 integrates the number of rotations of the right and left drive wheels 261L, 261R. The abrasion degree calculation unit 213 stores the integrated values of the numbers of rotations in a memory or the like, as the abrasion degree information 223. The integrated values of the numbers of rotations are values indicating the abrasion degrees of the components for the right and left wheels.

As the integrated value of the number of rotations is larger, the abrasion (attrition) of a tire of the drive wheel 261 is larger. Consequently, the abrasion degree calculation unit 213 can calculate the right and left abrasion degrees depending on the detection results of the wheel sensors 264L, 264R, respectively. Further, in the case where an administrator or the like performs maintenance to replace the drive wheels 261L, 261R with new articles, the abrasion degree calculation unit 213 resets the abrasion degree of the replaced drive wheel to an initial value (for example, zero).

The route planning unit 115 manages traveling depending on the abrasion degree. That is, the route planning unit 115 performs path search, task assignment and others, based on the abrasion degrees of each mobile robot 20. The route planning unit 115 makes the route plan such that the right-left difference between the abrasion degrees of each mobile robot 20 is reduced.

Task Assignment Example 1

Figure 5:
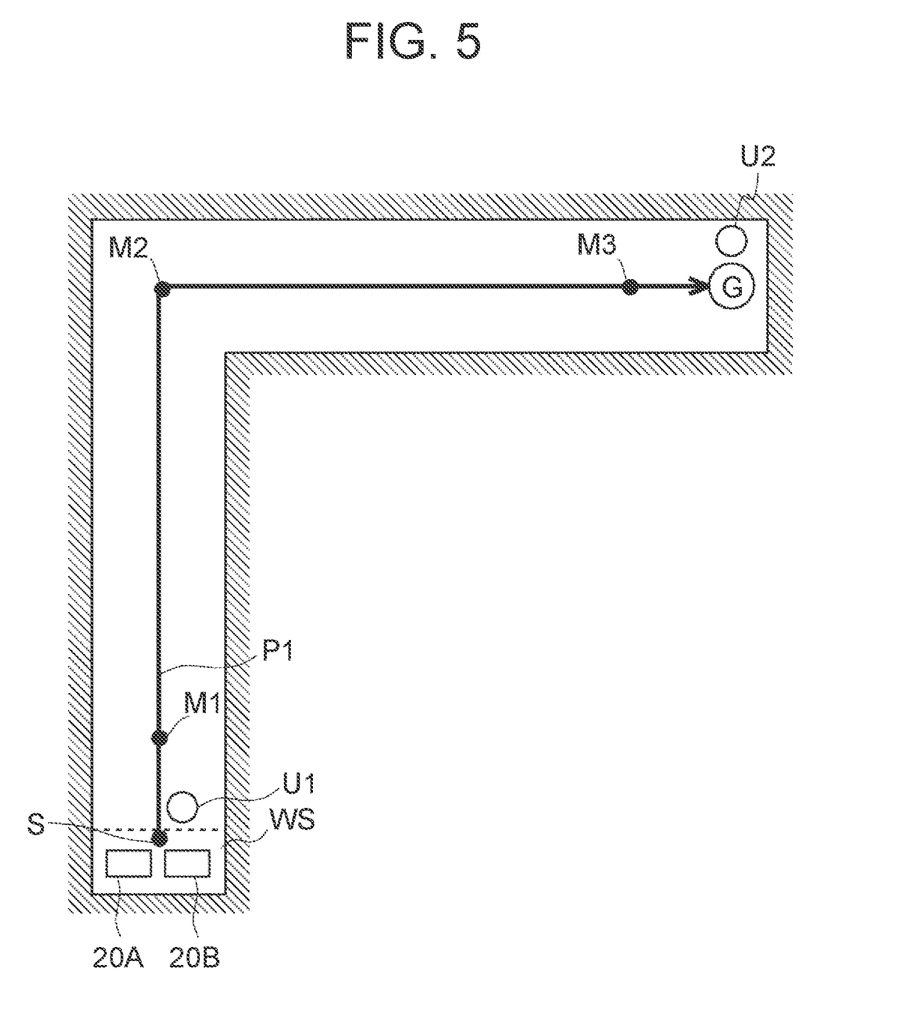
FIG. 5 is a diagram for describing Assignment Example 1.

FIG. 5 is a diagram for describing Assignment Example 1 for tasks. FIG. 5 shows an example in which the user U1 performs a carrying request such that the carried object is carried from a carrying start place S to a carrying goal place G. In FIG. 5, two mobile robots that wait at a waiting space WS are shown as mobile robots 20A, 20B. Furthermore, the user U1 performs the carrying request at the vicinity of the waiting space WS. The user U1 is at the vicinity of the carrying start place S, and the user U2 is at the periphery of the carrying goal place G. Further, the positions of the mobile robots 20A, 20B at the start of the task roughly coincide with the carrying start place S.

Passing points M1 to M3 are set on a movement path P1 from the carrying start place S to the carrying goal place G. The mobile robot 20 passes through the passing points M1, M2, M3 in order. On the movement path P1 from the carrying start place S to the carrying goal place G, the number of right turns is larger than the number of left turns. Specifically, the number of left turns is zero, and the number of right turns is one.

Accordingly, in the case of the movement on the movement path P1, the number of rotations of the left drive wheel 261 is larger than the number of rotations of the right drive wheel 261. In other words, in the case of the movement on the movement path P1, the left drive wheel 261 abrades by a larger amount than the right drive wheel 261. In this way, the abrasion degree of the left drive wheel 261 is higher than the abrasion degree of the right drive wheel 261, in this carrying task.

Before the carrying, in the mobile robot 20A, the abrasion degree of the left drive wheel 261 is higher than the abrasion degree of the right drive wheel 261. Before the carrying, in the mobile robot 20B, the abrasion degree of the right drive wheel 261 is higher than the abrasion degree of the left drive wheel 261. Accordingly, the route planning unit 115 assigns the task to the mobile robot 20B. That is, the route planning unit 115 assigns the task to the mobile robot 20B, such that the right-left difference between the abrasion degrees is eliminated.

Since the route planning unit 115 manages traveling based on the abrasion degrees of the right and left drive wheels 261, it is possible to postpone the maintenance. For example, it is possible to decrease the number of times that the maintenance such as tire replacement is performed, and therefore it is possible to carry the carried object more efficiently. When one drive wheel 261 has a higher abrasion degree than the other drive wheel 261, it is necessary to perform component replacement for only the drive wheel having a higher abrasion degree. By managing traveling so as to uniform the abrasion degree between the right and left drive wheels 261, it is possible to replace the right and left components in one maintenance. Thereby, it is possible to efficiently execute tasks.

In FIG. 5, when the carrying task for which the abrasion degree of the left drive wheel is higher is assigned to the mobile robot 20 in which the abrasion degree of the left drive wheel is higher, the difference between the abrasion degree of the right drive wheel 261 and the abrasion degree of the left drive wheel 261 further increases. Consequently, it is necessary to replace only the left component. Alternatively, it is necessary to replace the right component with a low abrasion degree, along with the left component with a high abrasion degree. Consequently, the route planning unit 115 assigns the task to the mobile robot 20B such that the right-left difference between the abrasion degrees is eliminated, and thereby it is possible to efficiently perform the maintenance.

In the case where the maintenance such as component replacement is performed, the abrasion degree may be initialized. That is, in the case where the left tire is replaced, the abrasion degree of the left drive wheel 261 is reset to an initial value (for example, zero), and in the case where the right tire is replaced, the abrasion degree of the right drive wheel 261 is reset to the initial value. Further, the abrasion degree may be set for each of components such as a tire, a motor and a gear.

The route planning unit 115 may estimate the abrasion degrees of the right and left drive wheels 261, depending on the movement path searched by the route planning unit 115. That is, for the carrying task, the route planning unit 115 may calculate estimated values of the abrasion degrees of the right and left drive wheels 261, and may decide the mobile robot 20 to which the task is assigned, from the estimated values of the abrasion degrees.

Task Assignment Example 2

Figure 6:
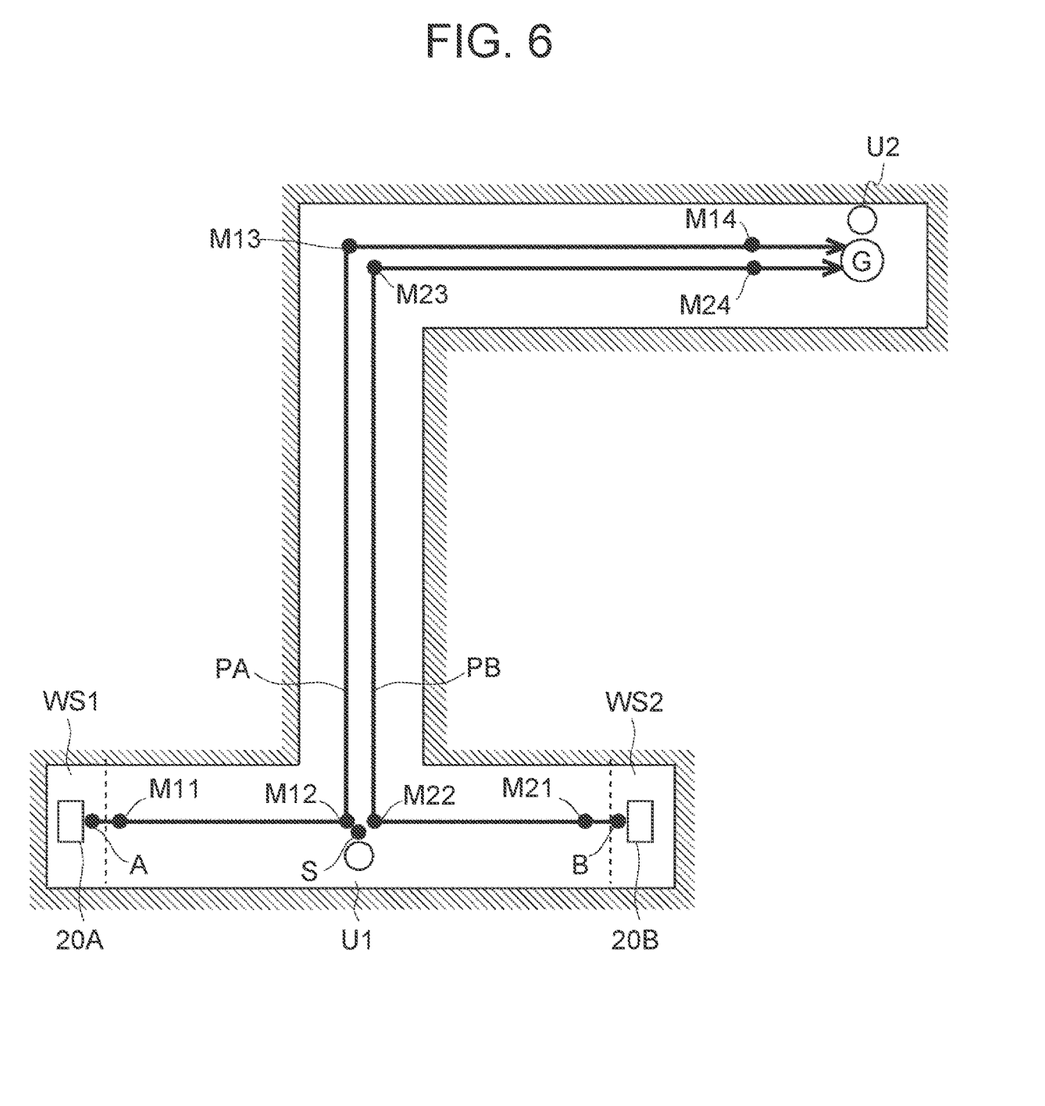
FIG. 6 is a diagram for describing Assignment Example 2.

FIG. 6 is a diagram for describing Assignment Example 2 for tasks. In FIG. 6, the mobile robot 20A and the mobile robot 20B wait at different positions. Specifically, the mobile robot 20A waits at a waiting space WS1, and the mobile robot 20B waits at a waiting space WS2.

A processing example in which the task is assigned to the mobile robot 20A will be described. For example, the user U1 at the carrying start place S performs a carrying request to carry the carried object to the carrying goal place G. The mobile robot 20A moves to the carrying start place S for accepting the carried object. The user U1 loads the carried object in the mobile robot 20A, and thereafter the mobile robot 20A moves to the carrying goal place G.

The current position of the mobile robot 20A is referred to as a current position A, and the current position of the mobile robot 20B is referred to as a current position B. At the start of the task, the position of the mobile robot 20A and the position of the mobile robot 20B are different. A path from the current position A through the carrying start place S to the carrying goal place G is referred to as a movement path PA. On the movement path PA, passing points M11 to M14 are set. A path from the current position B through the carrying start place S to the carrying goal place G is referred to a movement path PB. On the movement path PB, passing points M21 to M24 are set.

On the movement path PA, the number of left turns is one, and the number of right turns is one. On the movement path PB, the number of left turns is zero, and the number of right turns is two. The movement path PA and the movement path PB have almost the same distance. Consequently, on the movement path PA, the abrasion degrees of the right and left drive wheels 261 are almost equal. On the movement path PB, the abrasion degree of the left drive wheel 261 is higher.

In the mobile robot 20A, the abrasion degrees of the right and left drive wheels 261 are almost equal. Further, in the mobile robot 20B, the abrasion degrees of the right and left drive wheels 261 are almost equal. Consequently, when the route planning unit 115 assigns the task to the mobile robot 20B that travels on the movement path PB, the right-left difference between the abrasion degrees increases in the mobile robot 20B. Accordingly, the route planning unit 115 assigns the task to the mobile robot 20A. That is, the route planning unit 115 decides the mobile robot 20 that executes the task, depending on the right-left difference between the abrasion degrees. It is possible to eliminate the right-left difference between the abrasion degrees, and therefore it is possible to efficiently perform the maintenance.

Modification 1

Figure 7:
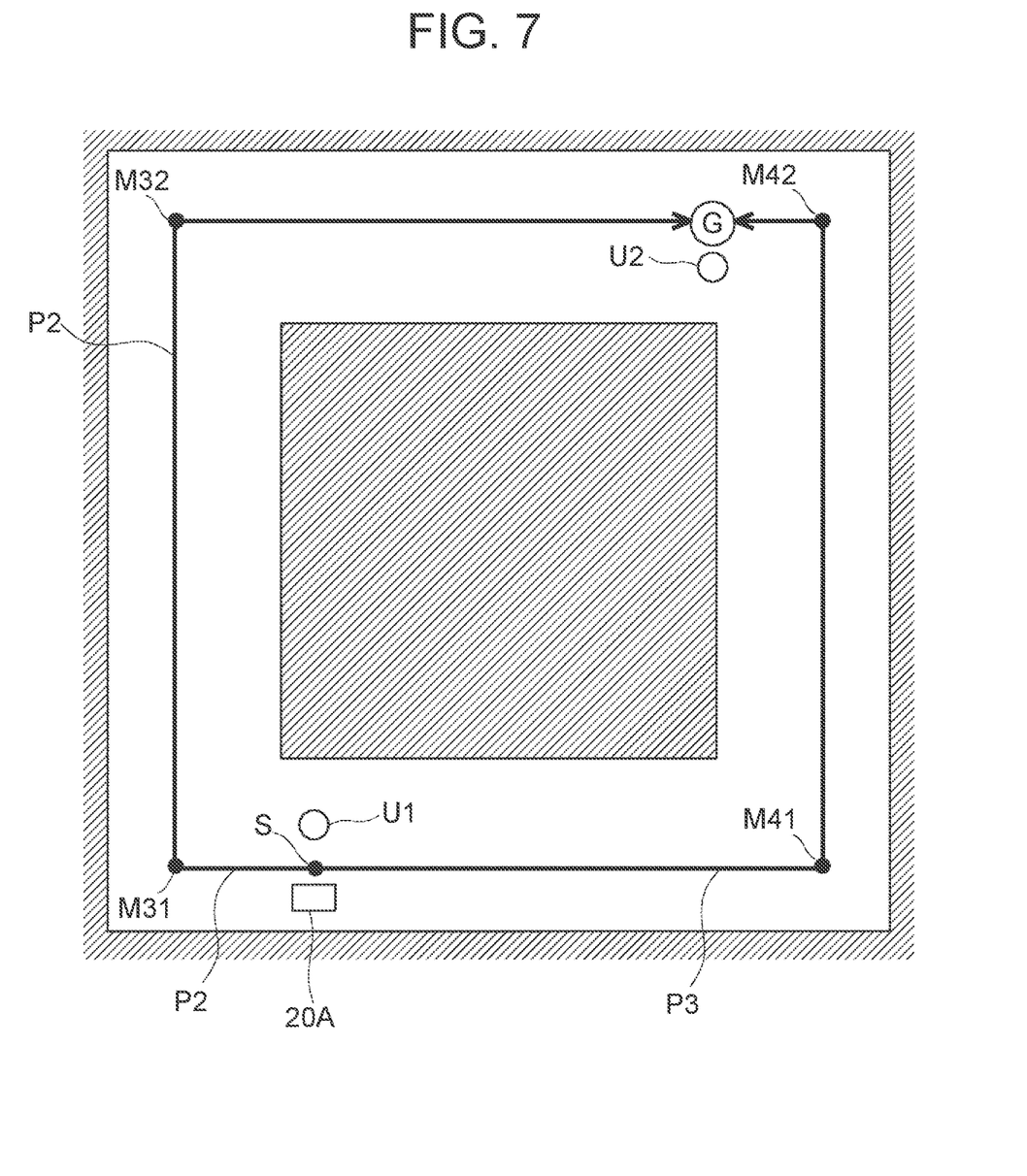
FIG. 7 is a diagram for describing Modification 1.

Modification 1 will be described with use of FIG. 7. FIG. 7 shows an example in which one mobile robot 20 moves from carrying start place S to the carrying goal place G. Furthermore, by search, a counterclockwise movement path P2 and a clockwise movement path P3 are obtained as the movement path from the carrying start place S to the carrying goal place G. On the movement path P2, passing points M31, M32 are set. On the movement path P3, passing points M41, M42 are set.

On the counterclockwise movement path P2, the number of right turns is two, and the number of left turns is zero. On the counterclockwise movement path P2, the abrasion degree of the left drive wheel 261 is higher than the abrasion degree of the right drive wheel 261. On the clockwise movement path P3, the number of right turns is zero, and the number of left turns is two. On the clockwise movement path P3, the abrasion degree of the right drive wheel 261 is higher than the abrasion degree of the left drive wheel 261.

In the mobile robot 20 before the execution of the task, the abrasion degree of the left drive wheel 261 is higher than the abrasion degree of the right drive wheel 261. Accordingly, the route planning unit 115 selects the movement path P3. That is, the route planning unit 115 sends the action command to the mobile robot 20, such that the mobile robot 20 moves along the movement path P3. Thereby, it is possible to reduce the right-left difference between the abrasion degrees of the mobile robot 20. The route planning unit 115 searches the route for the mobile robot 20 depending on the right-left difference between the abrasion degrees. It is possible to eliminate the right-left difference between the abrasion degrees, and therefore it is possible to efficiently perform the maintenance.

In Modification 1, the traveling management can be performed by only the mobile robot 20, and therefore the traveling management by the higher-level management device 10 can be excluded. That is, the mobile robot 20 may search a plurality of paths, and may employ one path from the plurality of paths, depending on the abrasion degree. In this case, the computation processing unit 21 or the like of the mobile robot 20 executes the process of the route planning unit 115. A control program is executed such that the process and function of the route planning unit 115 is assigned to the computation processing unit 21 of the mobile robot 20.

By search, the computation processing unit 21 obtains the movement path P2 and the movement path P3. The computation processing unit 21 calculates the abrasion degrees of the right and left drive wheels 261 on the movement paths P2, P3. The computation processing unit 21 decides the movement path based on the current abrasion degrees and the abrasion degrees on the movement path. The computation processing unit 21 decides the movement path such that the right-left difference between the abrasion degrees is reduced at the time of the arrival at the destination. In this way, the computation processing unit 21 decides the movement path depending on the abrasion degree, and thereby it is possible to efficiently control the mobile robot 20.

Assignment Example 1, Assignment Example 2 and Modification 1 described above can be combined with each other when appropriate. In a configuration in which the higher-level management device 10 manages the traveling of a plurality of mobile robots 20, the route planning unit 115 may search one or a plurality of paths for each mobile robot 20. Then, the route planning unit 115 may decide an optimal mobile robot and an optimal path from the plurality of mobile robots and the plurality of paths.

As described above, the system 1 according to the embodiment controls a plurality of mobile robots 20. Each of the mobile robots 20 includes the right and left wheels. The system 1 includes the route planning unit 115 and the abrasion degree calculation unit 213 that calculates the abrasion degrees of the right and left wheels. The route planning unit 115 serves as a management unit that manages the traveling of the plurality of mobile robots 20 depending on the abrasion degrees. Thereby, the maintenance can be appropriately performed, allowing an efficient control. For example, the route planning unit manages the traveling such that the right-left difference between the abrasion degrees of the mobile robot 20 is eliminated. Thereby, it is possible to decrease the number of maintenances.

Further, the route planning unit 115 may decide the mobile robot that carries the carried object, depending on the movement path from the carrying start place of the carried object to the carrying goal place of the carried object. For example, in the case where the higher-level management device 10 accepts the carrying request, the route planning unit 115 searches the movement path such that the mobile robot 20 can move in a short time. The route planning unit 115 searches a movement path that has a shorter distance, and a movement path that is less congested. The route planning unit 115 may assign the task to the mobile robot 20, depending on abrasion degrees that are estimated when the mobile robot 20 travels on the movement route and the current abrasion degrees of the mobile robot 20. For example, the route planning unit 115 may assign the task to an appropriate mobile robot 20, depending on the number of left turns on the movement path, the number of right turns on the movement path, and the like.

Furthermore, the route planning unit 115 may decide the robot that carries the carried object, depending on positions of the plurality of mobile robots, the carrying start place of the carried object, and the carrying goal place of the carried object. For example, the route planning unit 115 assigns the task to the mobile robot 20 based on the movement path from the current position of the mobile robot 20 to the carrying start place. For example, by assigning the task to a mobile robot 20 at a position close to the carrying start place, it is possible to shorten the total movement distance in the whole system, and therefore it is possible to decrease the number of maintenances.

The route planning unit 115 may tentatively decide a movement path from the current position of the mobile robot 20 through the carrying start place to the carrying goal place. Then, the route planning unit 115 selects the robot that carries the carried object, based on the tentatively decided movement path. For example, the route planning unit 115 tentatively decides the movement path from the current position through the carrying start place to the carrying goal place, for each mobile robot 20. The route planning unit 115 may tentatively decide the movement path for all mobile robots 20, or may tentatively decide the movement path for only some mobile robots 20. Specifically, the route planning unit 115 tentatively decides the movement path, for mobile robots 20 for which the distance from the current position to the carrying start place is within a predetermined distance. Then, the route planning unit 115 assigns the task to a mobile robot 20 that has such a movement path that the right-left difference between the abrasion degrees is eliminated.

In this way, the route planning unit 115 may manage traveling using not only the abrasion degrees of the mobile robot 20 but also information other than the abrasion degrees.

Figure 8:
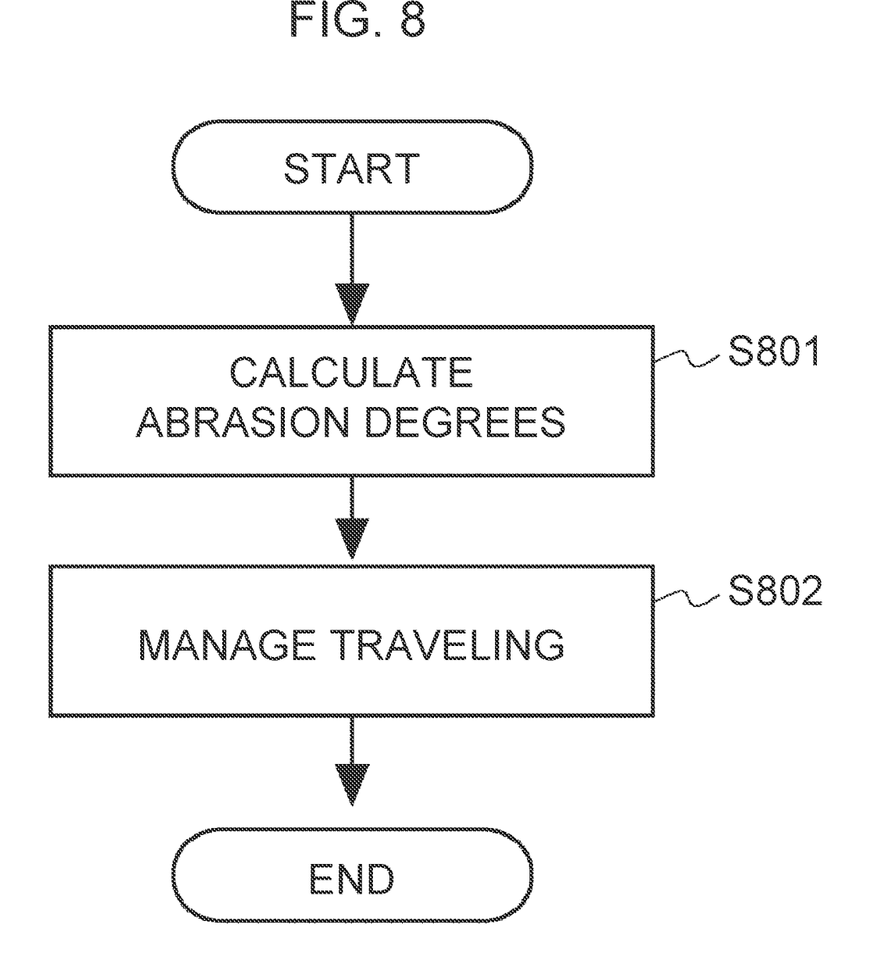
FIG. 8 is a flowchart showing a robot control method according to the embodiment.

FIG. 8 is a flowchart showing a robot control method according to the embodiment. First, the abrasion degree calculation unit 213 calculates abrasion degrees (S801). For example, as the abrasion degrees, the abrasion degree calculation unit 213 calculates the integrated values of the numbers of rotations of the right and left wheels (the drive wheels 261L, 261R). The higher-level management device 10 may perform at least a part of the process in the abrasion degree calculation unit 213.

Next, the route planning unit 115 manages traveling based on the abrasion degrees (S802). For example, the route planning unit 115 manages traveling such that the difference between the abrasion degrees of the right and left drive wheels 261 is eliminated. Specifically, the route planning unit 115 may select the mobile robot 20 based on the movement path and the abrasion degree. Alternatively, the route planning unit 115 may search a plurality of movement paths, and may select the movement path based on the abrasion degree of the closest mobile robot 20. Thereby, it is possible to efficiently manage traveling.

Further, some or all of the processes in the higher-level management device 10, the mobile robot 20 or the like described above can be realized as computer programs. The programs can be stored using various types of non-transitory computer-readable media, and can be supplied to computers. The non-transitory computer-readable media include various types of tangible recording media. Examples of the non-transitory computer-readable media include a magnetic recording medium (for example, a flexible disk, a magnetic tape and a hard disk drive), a magneto-optical recording medium (for example, a magneto-optical desk), a CD-ROM (Read Only Memory), a CD-R, a CD-R/W, a semiconductor memory (for example, a mask ROM, a programmable ROM (PROM), an erasable PROM (EPROM), a flash ROM, and a random access memory (RAM)). Further, the programs may be supplied to computers using various types of transitory computer-readable media. Examples of the transitory computer-readable media include an electric signal, an optical signal and an electromagnetic wave. The transitory computer-readable media can supply the programs to computers through a wired communication channel such as an electric wire and an optical fiber, or a wireless communication channel.

The present disclosure is not limited to the above embodiment, and when appropriate, modifications can be made without departing from the spirit.

What is claimed is:

1. A mobile robot comprising:
   right and left wheels;
   a right wheel sensor configured to detect a rotation angle of the right wheel;
   a left wheel sensor configured to detect a rotation angle of the left wheel;
   a processor programmed to elect a movement path for the mobile robot; and
   a memory, wherein
   the processor is programmed to
      acquire the rotation angle of the right wheel from the right wheel sensor,
      acquire the rotation angle of the left wheel from the left wheel sensor,
      calculate a first integrated value of the number of rotations of the right wheel based on the acquired rotation angle of the right wheel,
      calculate a second integrated value of the number of rotations of the left wheel based on the acquired rotation angle of the left wheel,
      set passing points of the movement path including a departure place and a destination, the passing points being set to corners where the mobile robot turns right or left,
      store a plurality of the movement paths in the memory,
      elect, among the plurality of the movement paths, a movement path in which the number of the passing points where the mobile robot turns right is larger than that of the other movement paths among the plurality of the movement paths, in response to the first integrated value being larger than the second integrated value, and
      control the right and left wheels such that the mobile robot moves based on the elected movement path.

2. The mobile robot according to claim 1, wherein the processor is further programmed to:
   elect, among the plurality of the movement paths, a movement path in which the number of the passing points where the mobile robot turns left is larger than that of the other movement paths among the plurality of the movement paths, in response to the first integrated value being smaller than the second integrated value.

3. The mobile robot according to claim 1, further comprising a camera, wherein
   a floor map is stored in the memory,
   candidates of the passing points are previously registered in the floor map, and
   the processor is programmed to:
      estimate a congestion situation of the movement path based on an image of the camera, and
      set the passing points depending on the congestion situation.

4. The mobile robot according to claim 3, wherein the processor is programmed to set the passing points such that the mobile robot moves in the shortest time.

5. The mobile robot according to claim 3, wherein the processor is programmed to dynamically change the passing points depending on a change in the congestion situation.

* * * * *